(12) United States Patent
Szlag (10) Patent No.: US 11,077,773 B2
(45) Date of Patent: Aug. 3, 2021

(54) VEHICLE SEAT HAVING AN EASY-ENTRY MECHANISM

(71) Applicant: VOLKSWAGEN AKTIENGESELLSCHAFT, Wolfsburg (DE)

(72) Inventor: Robert Szlag, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/847,177

(22) Filed: Apr. 13, 2020

(65) Prior Publication Data

US 2020/0238862 A1 Jul. 30, 2020

Related U.S. Application Data

(63) Continuation of application No. PCT/EP2018/077475, filed on Oct. 9, 2018.

(30) Foreign Application Priority Data

Oct. 11, 2017 (DE) .................... 10 2017 218 125.7

(51) Int. Cl.
*B60N 2/12* (2006.01)
*B60N 2/90* (2018.01)
*B60N 2/20* (2006.01)

(52) U.S. Cl.
CPC ................ *B60N 2/12* (2013.01); *B60N 2/20* (2013.01); *B60N 2/919* (2018.02); *B60N 2002/971* (2018.02)

(58) Field of Classification Search
CPC . B60N 2/12; B60N 2/919; B60N 2/20; B60N 2002/971
USPC ......................................................... 297/341
See application file for complete search history.

(56) References Cited

U.S. PATENT DOCUMENTS

| 4,822,101 | A | * | 4/1989 | Hosoe | ...................... | B60N 2/12 |
| | | | | | | 297/341 |
| 5,927,809 | A | | 7/1999 | Tame | | |
| 6,152,533 | A | * | 11/2000 | Smuk | ...................... | B60N 2/12 |
| | | | | | | 297/341 |
| 6,352,310 | B1 | | 3/2002 | Schmidt et al. | | |

(Continued)

FOREIGN PATENT DOCUMENTS

| DE | 199 10 085 C1 | 10/2000 |
| DE | 697 04 957 T2 | 11/2001 |

(Continued)

*Primary Examiner* — Mark R Wendell
(74) *Attorney, Agent, or Firm* — Muncy, Geissler, Olds Lowe, P.C.

(57) ABSTRACT

A vehicle seat having a backrest, which can be pivoted about a backrest pivot axis, at least one pair of seat rails for adjusting the seat length of the vehicle seat, and a locking device for locking the at least one pair of seat rails, wherein there is at least one lockable fitting for deflecting the backrest relative to a seat part, and the backrest can be pivoted into an easy-entry position, which can be assumed for easier accessibility to a row of seats, wherein the vehicle seat has an easy-entry mechanism, which comprises a latch, which is arranged on a drive element and which can be captured by an easy-entry stop, arranged on the backrest, during pivoting of the backrest into the easy-entry position and can thereby follow the motion of the backrest.

11 Claims, 6 Drawing Sheets

(56) References Cited

U.S. PATENT DOCUMENTS

| | | | |
|---|---|---|---|
| 8,616,647 B2 * | 12/2013 | Chen | B62B 9/104 |
| | | | 297/364 |
| 8,960,800 B2 * | 2/2015 | Champ | B60N 2/235 |
| | | | 297/378.1 |
| 9,180,799 B2 | 11/2015 | Teufel et al. | |
| 9,487,113 B2 | 11/2016 | Schukalski | |
| 9,539,918 B2 | 1/2017 | Rothstein et al. | |
| 9,868,369 B1 * | 1/2018 | Aktas | B60N 2/12 |
| 9,889,781 B2 * | 2/2018 | Pastoors | B60N 2/22 |
| 10,150,393 B2 | 12/2018 | Pluta et al. | |
| 10,308,146 B1 * | 6/2019 | Kish | B60N 2/12 |
| 10,406,946 B2 | 9/2019 | Kreuels et al. | |
| 10,621,470 B2 * | 4/2020 | Ackley | G06K 9/6212 |
| 10,654,287 B2 * | 5/2020 | Hatle | B41J 2/355 |
| 10,654,697 B2 * | 5/2020 | Houle | B66F 9/07559 |
| 10,679,101 B2 * | 6/2020 | Ackley | G06K 9/6261 |
| 10,703,112 B2 * | 7/2020 | Teo | G06F 3/1205 |
| 10,728,445 B2 * | 7/2020 | Good | H04N 5/2354 |
| 10,731,963 B2 * | 8/2020 | Spargur | G01B 7/06 |
| 10,756,563 B2 * | 8/2020 | Ackley | H02J 7/045 |
| 10,756,900 B2 * | 8/2020 | Parikh | H04L 9/3247 |
| 10,773,537 B2 * | 9/2020 | Wong | B41J 3/36 |
| 10,809,949 B2 * | 10/2020 | Wong | B41J 3/445 |
| 10,884,059 B2 * | 1/2021 | Ackley | G06F 21/00 |
| 10,897,150 B2 * | 1/2021 | Liu | H02J 7/0044 |
| 2004/0113473 A1 * | 6/2004 | Kojima | B60N 2/12 |
| | | | 297/341 |
| 2005/0110323 A1 * | 5/2005 | Hofmann | B60N 2/3093 |
| | | | 297/378.1 |
| 2010/0133886 A1 * | 6/2010 | Gl | B60N 2/12 |
| | | | 297/341 |
| 2010/0207440 A1 * | 8/2010 | Hayakawa | B60N 2/12 |
| | | | 297/378.14 |
| 2011/0127818 A1 * | 6/2011 | Hazlewood | B60N 2/0705 |
| | | | 297/341 |
| 2011/0148164 A1 * | 6/2011 | Ooh | B60N 2/2358 |
| | | | 297/344.1 |
| 2012/0228913 A1 * | 9/2012 | Hurst | B60N 2/20 |
| | | | 297/354.12 |
| 2012/0261964 A1 * | 10/2012 | Yamaguchi | B60N 2/12 |
| | | | 297/378.14 |
| 2013/0057041 A1 * | 3/2013 | Ngiau | B60N 2/3059 |
| | | | 297/354.12 |
| 2013/0147250 A1 * | 6/2013 | Kim | B60N 2/12 |
| | | | 297/353 |
| 2014/0035340 A1 * | 2/2014 | Sollars | B60N 2/12 |
| | | | 297/362.11 |
| 2014/0183917 A1 * | 7/2014 | Becker | B60N 2/123 |
| | | | 297/344.1 |
| 2015/0202996 A1 * | 7/2015 | Kajale | B60N 2/206 |
| | | | 297/363 |
| 2016/0016486 A1 * | 1/2016 | Aktas | B60N 2/20 |
| | | | 297/378.12 |
| 2016/0347209 A1 * | 12/2016 | Pluta | B60N 2/0881 |

FOREIGN PATENT DOCUMENTS

| | | |
|---|---|---|
| DE | 10 2006 001 530 A1 | 7/2007 |
| DE | 10 2010 039 465 A1 | 2/2012 |
| DE | 10 2011 101 876 A1 | 11/2012 |
| DE | 20 2011 110 257 U1 | 5/2013 |
| DE | 10 2012 015 294 A1 | 5/2014 |
| DE | 10 2013 221 925 B3 | 9/2014 |
| DE | 10 2013 012 306 A1 | 1/2015 |
| DE | 10 2013 221 132 A1 | 4/2015 |
| DE | 10 2015 218 873 A1 | 1/2017 |
| WO | WO 2015/074633 A1 | 5/2015 |
| WO | WO 2017/012847 A1 | 1/2017 |

* cited by examiner

VEHICLE SEAT HAVING AN EASY-ENTRY MECHANISM

This nonprovisional application is a continuation of International Application No. PCT/EP2018/077475, which was filed on Oct. 9, 2018, and which claims priority to German Patent Application No. 10 2017 218 125.7, which was filed in Germany on Oct. 11, 2017, and which are both herein incorporated by reference.

BACKGROUND OF THE INVENTION

Field of the Invention

The present invention relates to an easy-entry mechanism of a vehicle seat for easier entry of a person into a row of seats, in particular a rear seat row.

Description of the Background Art

An easy-entry system for vehicle seats, which enables easier entry into a second or third row of seats in a vehicle, is known from the publication DE 10 2015 218 873 A1, which corresponds to U.S. Pat. No. 10,406,946. The easy-entry system can be actuated by an unlocking lever which is arranged on a backrest of the vehicle seat, as a result of which the backrest of the vehicle seat pivots out of an entry region. The vehicle seat is additionally arranged on rails, so that when the unlocking lever is actuated, the vehicle seat can additionally or alternatively be moved in the direction of travel out of the entry region. It is provided here that a locking device of the seat rail pair is unlocked by means of a Bowden cable, actuated by the pivoting movement of the backrest, by pivoting the backrest of the vehicle seat forward. A vehicle seat is disclosed in detail that has a rear base of a backrest which can be pivoted relative to the rear base about a backrest rotation axis. The vehicle seat further comprises at least one seat rail pair for the longitudinal adjustment of the vehicle seat, and a locking device for locking the at least one seat rail pair, wherein there is at least one lockable fitting for deflecting the backrest on the rear base, and the backrest can be pivoted into an easy-entry position, which can be assumed for easier accessibility to a rear row of seats. In addition, the vehicle seat has a latch which is arranged on a drive element and which, when the backrest is pivoted into the easy-entry position, can be held by a carrier, arranged on the backrest, and can thereby also be carried along so as to follow the movement of the backrest, wherein an actuation lever is provided and configured to act on the latch such that, when the backrest is pivoted, the latch is not held by the carrier and the backrest can be pivoted beyond the easy-entry position.

In addition, reference is made to the publications DE 10 2011 101 876 A1 (which corresponds to U.S. Pat. No. 9,180,799), DE 10 2012 015 294 A1 (which corresponds to U.S. Pat. No. 9,539,918), and DE 10 2013 221 925 B3 (which corresponds to U.S. Pat. No. 10,150,393), which disclose generic vehicle seats.

SUMMARY OF THE INVENTION

It is therefore an object of the present invention to improve an easy-entry mechanism of a vehicle seat of the generic type.

The starting point of the invention is a vehicle seat, particularly a motor vehicle seat, having a backrest, which can be pivoted about a backrest pivot axis, at least one seat rail pair for adjusting the seat length of the vehicle seat, and a locking device for locking the at least one seat rail pair, wherein there is at least one lockable fitting for deflecting the backrest relative to a seat part, and the backrest can be pivoted into an easy-entry position, which can be assumed for easier accessibility to a row of seats, wherein the vehicle seat has an easy-entry mechanism, which comprises a latch, which is arranged on a drive element and which can be captured by an easy-entry stop, arranged on the backrest, during pivoting of the backrest into the easy-entry position and can thereby follow the motion of the backrest.

It is provided according to the invention that the latch is moved by an easy-entry actuating element from an easy-entry stop (distant) initial position to an easy-entry stop (near) actuating position, in which the latch can be captured by the easy-entry stop, wherein the easy-entry actuating element prompts movement of the easy-entry actuating element upon actuating of an easy-entry triggering element, which is operatively connected to the easy-entry actuating element, such that the easy-entry actuating element moves the latch, in the actuating position thereof, by an operative connection between the latch and the easy-entry actuating element, to the easy-entry stop (near) actuating position.

Advantageously, in this easy-entry mechanism, no adjustment element needs to be actuated which acts on the latch, so that when the backrest is pivoted, the latch is not captured by the easy-entry stop and the backrest can be tilted beyond the easy-entry position, as is the case with the easy-entry mechanism disclosed in DE 10 2015 218 873 A1. The easy-entry mechanism advantageously enables the tilt adjustment of the backrest at any time without the latch having to be actuated.

The operative connection between the easy-entry triggering element and the easy-entry actuating element can be established by a first Bowden cable, the actuation of which brings about the actuating position.

The easy-entry actuating element can have a Bowden anchor for the one end, arranged in the easy-entry mechanism, of the first Bowden cable, which is connected with its other end to an easy-entry triggering element.

In addition, the operative connection between the easy-entry actuating element and the latch can be established by a slideway of the easy-entry actuating element, said slideway which engages on a control pin integrated in the latch and which ensures a displacement of the control pin in the actuating position such that a stop-side first contour of the latch arrives at the easy-entry-stop (near) actuating position.

The slideway can be formed on an end face of a segment of the easy-entry actuating element, said segment that projects radially relative to a backrest pivot axis.

The easy-entry actuating element can have a freewheel mechanism relative to a transmission rod arranged along the backrest pivot axis.

Release of the backrest for easy-entry folding into the easy-entry position:

It is provided that the actuation of the easy-entry actuating element by actuation of the easy-entry triggering element, in addition to actuation of the latch into the actuating position, causes the rotation of the transmission rod and thus the unlocking of the fitting, because the easy-entry actuating element has a freewheel mechanism relative to the transmission rod, a mechanism which causes the transmission rod to be taken along without freewheeling as soon as the easy-entry triggering element is actuated.

In addition, it is provided that the latch can be rotatably mounted in a rotating ring, which is rotatably mounted on the backrest axis of rotation, on a latch pivot axis arranged parallel to the backrest pivot axis, wherein a pull element is fixedly arranged on the rotating ring.

The pull element can have a Bowden anchor for the one end, arranged in the easy-entry mechanism, of a second Bowden cable which with its other end is operatively connected to the locking device of the seat rail pair.

Release of the vehicle seat for easy-entry longitudinal seat movement into the easy-entry position:

The easy-entry stop of the backrest captures the latch on the first contour by a movement of the backrest into the easy-entry position, as a result of which the rotating ring and the pull element are pivoted about the backrest pivot axis, so that the second Bowden cable is actuated and the locking device of the seat rail pair is unlocked.

It is provided in addition that the vehicle seat has an adjustment lever, arranged on the transmission rod, for tilt adjustment of the backrest relative to the seat part with a freewheel mechanism, which is arranged on the easy-entry mechanism but is decoupled on the force flow side from the easy-entry mechanism and thus is not required for the easy-entry function and is not part of the easy-entry mechanism. The main advantage of this decoupling of the adjustment lever from the easy-entry mechanism is explained in more detail in the description.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
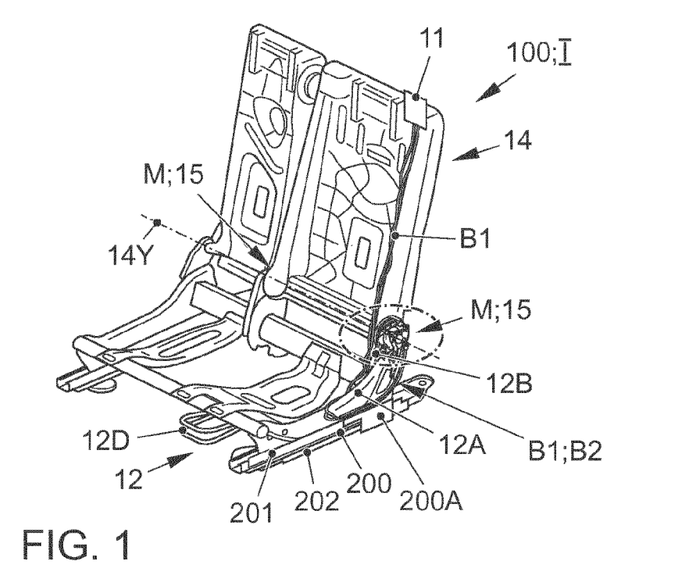
FIG. 1 shows a perspective view of a vehicle seat of the invention.

FIG. 1 shows a vehicle seat 100 of the invention in a perspective view.

Vehicle seat 100 has an adapter-like side part 12B which is connected to a seat structure 12A of seat part 12.

Figure 2:
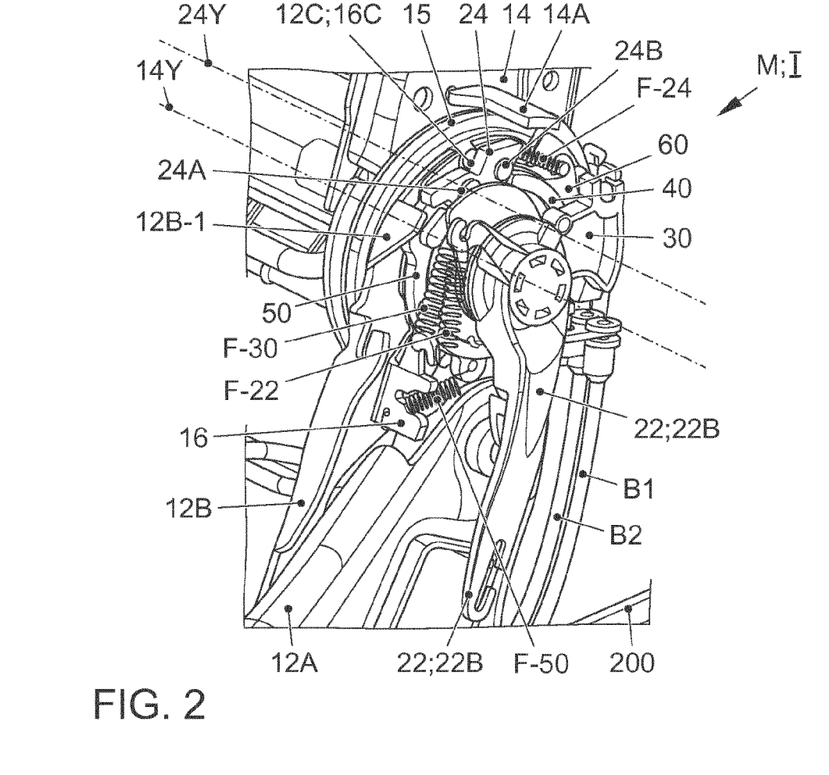
FIG. 2 shows a perspective view of an easy-entry mechanism of the vehicle seat of the invention.

According to FIG. 2 (assembled state of an easy-entry mechanism M) and 3A and 3B (exploded view of the easy-entry mechanism M), vehicle seat 100, according to FIG. 1, comprises, in an overview, a backrest 14, pivotable relative to side part 12B about a backrest pivot axis 14Y, and at least one seat rail pair 200 for the longitudinal adjustment of vehicle seat 100, and a locking device 200A for locking the at least one seat rail pair 200.

Figure 3A:
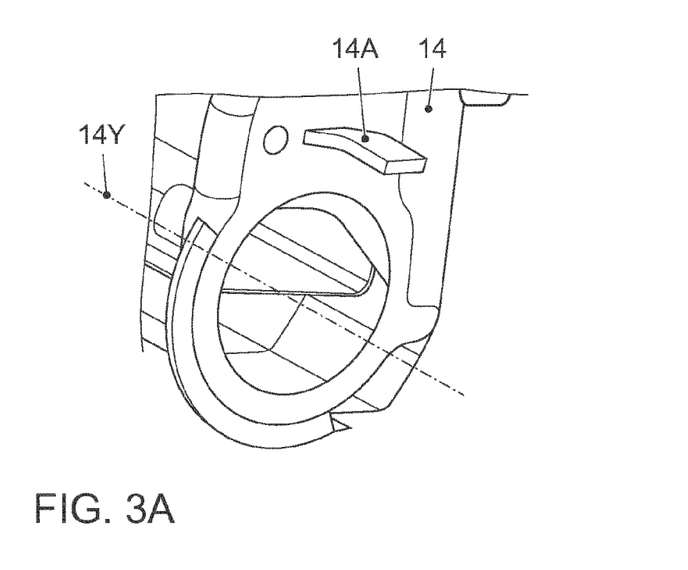
FIG. 3A shows a backrest with a backrest stop but without an easy-entry mechanism of the vehicle seat of the invention, which is shown in an exploded view in FIG. 3B.
Figure 3B:
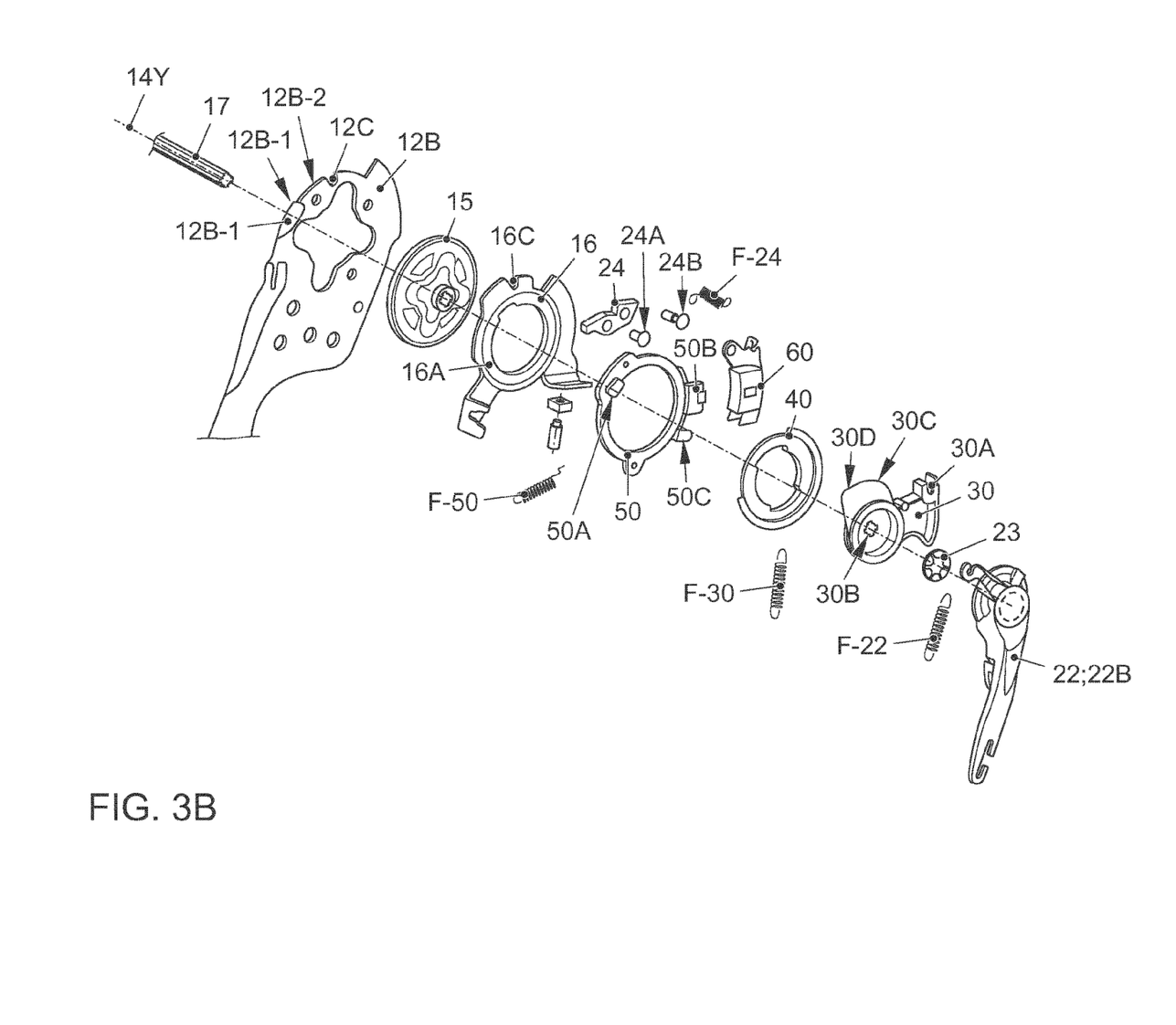
FIG. 3B shows the easy-entry mechanism of the invention in the exploded view.

FIG. 3A shows backrest 14 with backrest stop 14A but without the easy-entry mechanism M. The associated exploded view of the easy-entry mechanism is shown in FIG. 3B.

The adapter-like side part 12B is fastened to seat structure 12A of seat part 12. For the deflection of backrest 14, at least one lockable fitting 15 (compare FIG. 3B) is provided on the adapter-like side part 12B, and backrest 14 of vehicle seat 100 can be pivoted into an easy-entry position which can be assumed for easier access, in particular to a rear row of seats.

Fitting 15 is in this case arranged aligned with backrest pivot axis 14Y. Seat part 12 is connected to backrest 14 via fitting 15.

Vehicle seat 100 has the at least one lockable fitting 15.

To deflect backrest 14, a non-lockable backrest bearing or also a lockable fitting 15 (compare FIG. 1) is arranged on the side, opposite fitting 15, of vehicle seat 100. Fittings 15 are connected to one another by means of a transmission rod 17 (compare FIG. 3B), so that unlocking of one fitting 15 always leads to an unlocking of the other fitting 15.

Vehicle seat 100 comprises an adjustment lever 22 which can be pivoted about backrest pivot axis 14Y and which is connected to transmission rod 17, so that a rotational movement of adjustment lever 22 to unlock fitting 15 is transmitted to transmission rod 17.

Vehicle seat 100 has three basic functions:

First Basic Function—Longitudinal Seat Adjustment of Vehicle Seat 100:

Vehicle seat 100 comprises seat rail pair 200 which has an upper rail 201 and a lower rail 202 fixed to the body.

In a first adjustment region X1, in particular by 180 mm, the seat longitudinal adjustment is carried out by means of longitudinal seat adjustment lever 12D independently of an adjustment function of backrest 14 and the easy-entry adjustment. By actuation of longitudinal seat adjustment lever 12C, locking device 200A is opened and upper rail 201 (therefore vehicle seat 100) can be adjusted by the amount X1 relative to lower rail 202 fixed to body.

A further longitudinal seat adjustment is also possible if a second Bowden cable B2 is actuated, as a result of which locking device 200A is also opened and upper rail 201 (therefore vehicle seat 100) is adjustable relative to lower rail 202, fixed to the body, by the amount X1 and additionally by the amount X2, in particular by a further 70 mm. The actuation of second Bowden cable B2 is part of the easy-entry, which will be explained below.

Second Basic Function—Backrest Folding of Backrest 14:

The backrest can be folded into a floor position (not shown), which is also referred to as a fold-flat position or a cargo position. It usually serves to enlarge the loading space of a motor vehicle. In the floor position, backrest 14 is completely folded down counterclockwise onto seat part 12 in accordance with FIG. 1 so as to achieve as flat a load floor as possible. Here, backrest 14 is preferably incorporated into a vehicle floor such that backrest 14, with its rear side, forms a surface that is as flat as possible and merges into the rest of the load compartment floor.

Even when the easy-entry position is assumed, it is provided that fitting 15 is unlocked for the purpose of the backrest folding of backrest 14.

In the backrest folding of backrest 14 outside of the easy-entry function, in contrast to the easy-entry function, however, there is no provision for unlocking seat rail pair 200.

In order to enable unlocking of fitting 15 or fittings without a corresponding unlocking of seat rail pair 200, adjustment lever 22 is provided, which is rotated clockwise about backrest pivot axis 14Y in order to assume a floor position and to unlock the fitting(s) in accordance with an actuation direction. A loop (not shown) is preferably attached to adjustment lever 22, by means of which a reversible actuation of adjustment lever 22 is carried out against the force of a pretensioned tension spring F-22 (compare FIG. 3B). For this purpose, spring element F-22 at the one end is hooked in a mount in adjustment lever 22 (compare FIG. 2), and at the other end is hooked in a mount of a base plate 16.

FIG. 2 shows a perspective view of an easy-entry mechanism M of vehicle seat 100 of the invention.

Backrest 14 can also be folded into a comfort position (not shown). For this purpose, a reversible actuation of adjustment lever 22 is also carried out counter to the force of a pretensioned tension spring F-22 (compare FIG. 3B) in the clockwise direction of backrest pivot axis 14Y, so that the fitting(s) 15 is/are unlocked, as a result of which backrest 14 is adjustable backwards by preferably 10° counter to the force of a pretensioned backrest spring (also not shown) by the seated person pressing his back against the backrest.

In the floor position and the comfort position, it is provided that fitting 15 is locked again in order to hold vehicle seat 100 in the respective position. In order to unlock backrest 14 again and to raise it again, adjustment lever 22 must again be moved clockwise in the actuation direction. Backrest 14 can then be adjusted again accordingly.

The longitudinal seat adjustment and the backrest folding are advantageously carried out, without intervention, in the easy-entry mechanism, which will be explained below. In the backrest folding known from the prior art, a latch of the easy-entry mechanism M has to be moved out of the travel path of a backrest-side stop, which is seen as a disadvantage, as will be explained in detail below.

Third Basic Function—Easy-Entry Position of Vehicle Seat 100:

Entry into a rear row of seats is to be made easier with the easy-entry folding into the easy-entry position. When the easy-entry function is actuated, fitting 15 and seat rail pair 200, provided for the longitudinal seat adjustment, are unlocked, as a result of which backrest 14 is folded forwards up to the easy-entry position in the viewing direction of an occupant of vehicle seat 100 and is moved forwards by adjustment region X1 plus X2 in the sense of the longitudinal seat adjustment, which creates a maximum entry area.

The basic structure of vehicle seat 100 in the assembled state has already been explained in accordance with FIGS. 1 and 2.

The inventive structure of the easy-entry mechanism is further described below in an overview of FIGS. 2 to 4D.

In FIGS. 2 to 4D, the easy-entry mechanism is in an initial position I in which no actuation has yet taken place.

The components shown in the exploded view in FIG. 3B are described below starting from adjustment lever 22 in the direction of the adapter-like side part 12B, which is connected to seat structure 12A of vehicle seat 100.

Adjustment lever 22 sits on transmission rod 17 and a securing ring 23 (compare FIGS. 3B and 4A) secures a specially designed easy-entry actuating element 30 which is arranged on transmission rod 17.

Figure 4A:
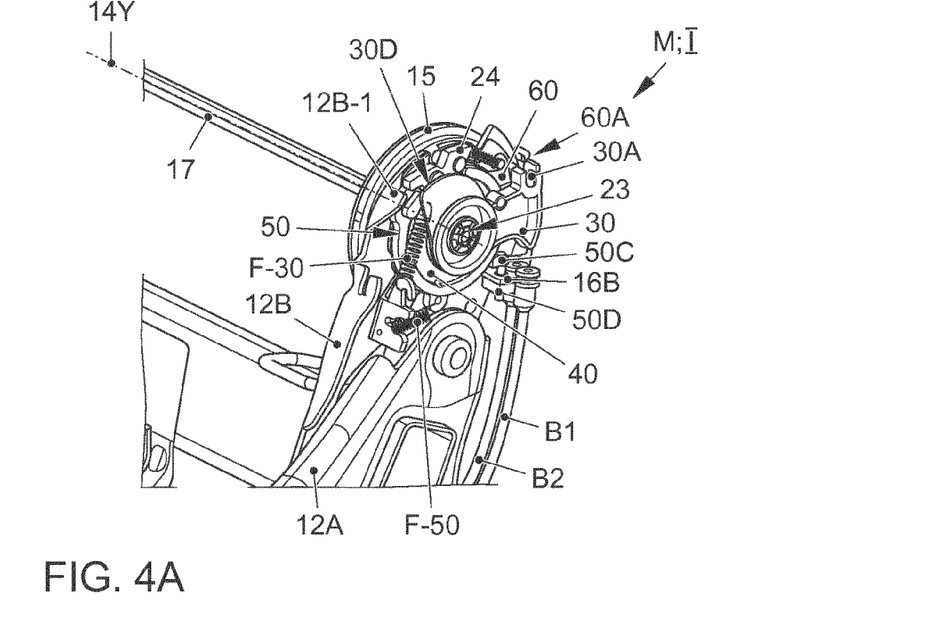
FIG. 4A shows the easy-entry mechanism according to FIG. 2 but without an adjustment lever.

FIG. 4A shows the easy-entry mechanism M according to FIG. 2 but without adjustment lever 22.

Easy-entry actuating element 30 comprises a Bowden anchor 30A (compare FIGS. 3B and 4A) for a first Bowden cable B1 by means of which the easy-entry unlocking is carried out.

Figure 5A:
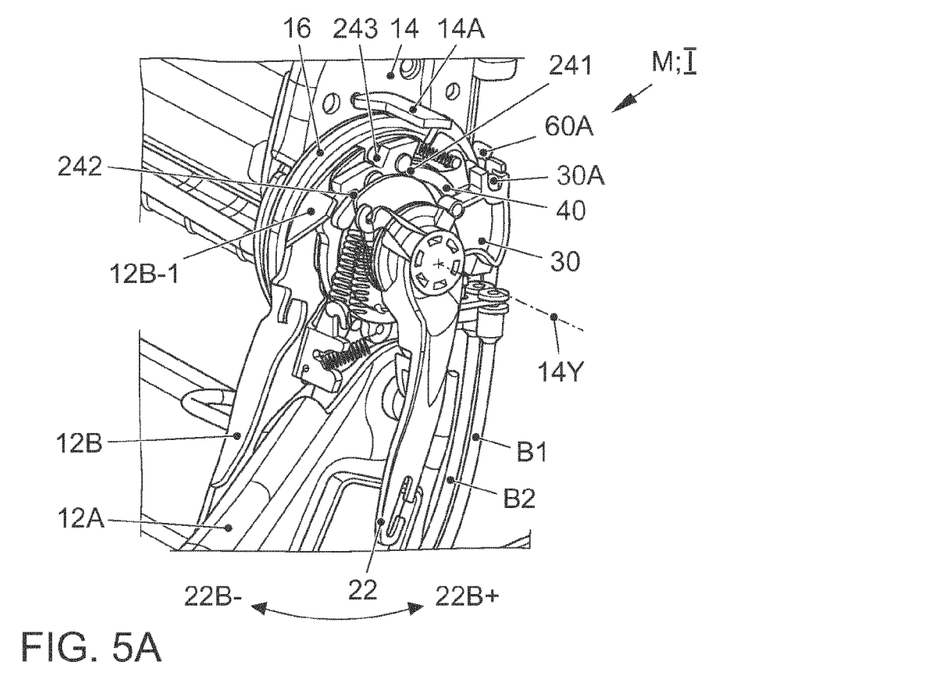
FIG. 5A shows the easy-entry mechanism in an initial position I.
Figure 5B:
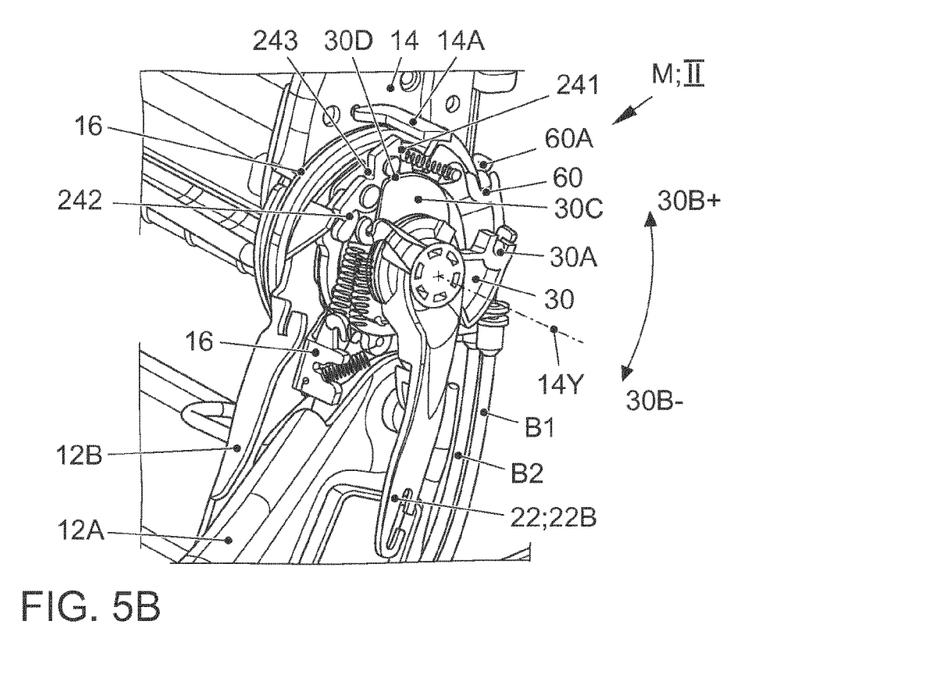
FIG. 5B shows the easy-entry mechanism in actuating position II.

Easy-entry actuating element 30 is arranged on transmission rod 17 by means of a freewheel mechanism 30B; 30B+, 30B− (compare FIG. 3) such that a rotational movement of easy-entry actuating element 30 is transmitted to transmission rod 17 exclusively in the clockwise direction (compare FIG. 5B) and therefore without freewheeling 30B− (compare FIG. 5B). In other words: If easy-entry actuating element 30 is rotated by a predeterminable angle, in particular by 30°, transmission rod 17 is carried along. Freewheel mechanism 30B does not transmit a rotational movement of easy-entry actuating element 30 to transmission rod 17 in the opposite direction 30B+, here in the counterclockwise direction.

The same applies to adjustment lever 22. It is also connected to transmission rod 17 via a freewheel mechanism 22B. If adjustment lever 22 is in particular also rotated by 30° when fitting 15 is unlocked, the rotational movement of adjustment lever 22 is transmitted to transmission rod 17 only in a clockwise direction without freewheeling 22B−. Freewheel mechanism 22B does not transmit a rotational movement of adjustment element 22 to transmission rod 17 in the opposite direction, here in the counterclockwise direction, with active freewheeling 22B+.

In addition, adjustment lever 22 and easy-entry actuating element 30 are decoupled from one another, so that actuation of adjustment lever 22 does not also actuate easy-entry actuating element 30 and vice versa.

As a result, the easy-entry function of vehicle seat 100 is decoupled from the tilt adjustment of backrest 14.

A semicircular segment 30C (compare FIGS. 3B and 4A) is formed offset from easy-entry actuating element 30 and forms a slideway 30D on its end face.

Figure 4B:
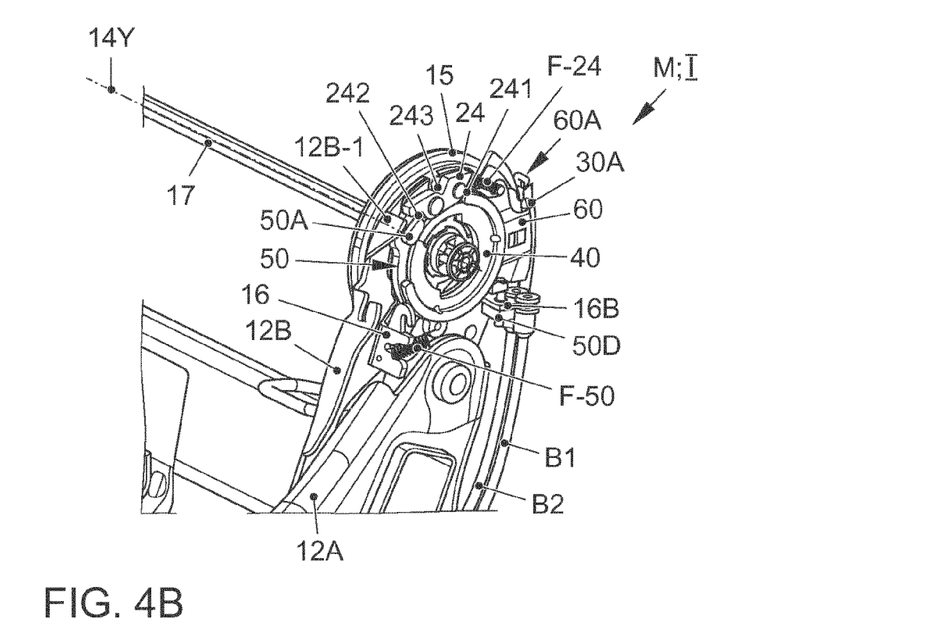
FIG. 4B shows the easy-entry-mechanism according to FIG. 2 but without an adjustment lever and without the easy-entry actuating element.
Figure 4C:
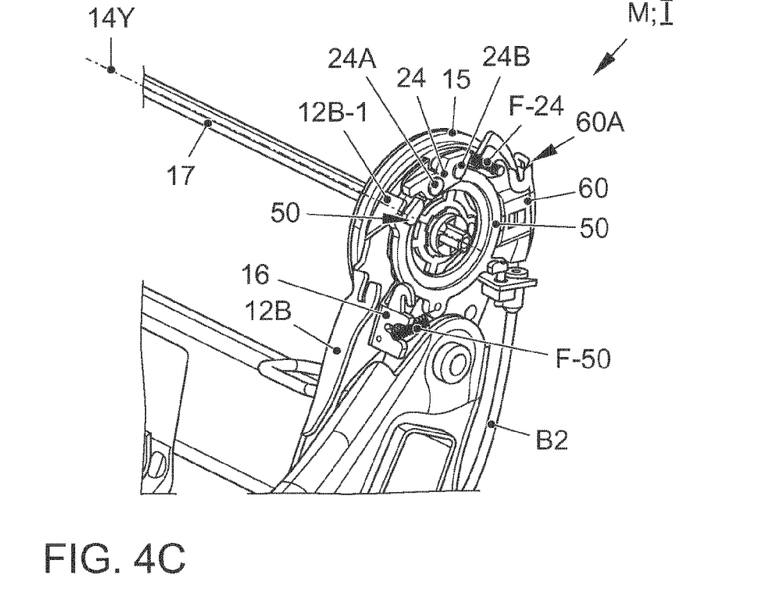
FIG. 4C shows the easy-entry mechanism according to FIG. 2 but without an adjustment lever and without the easy-entry actuating element and without a securing element.
Figure 4D:
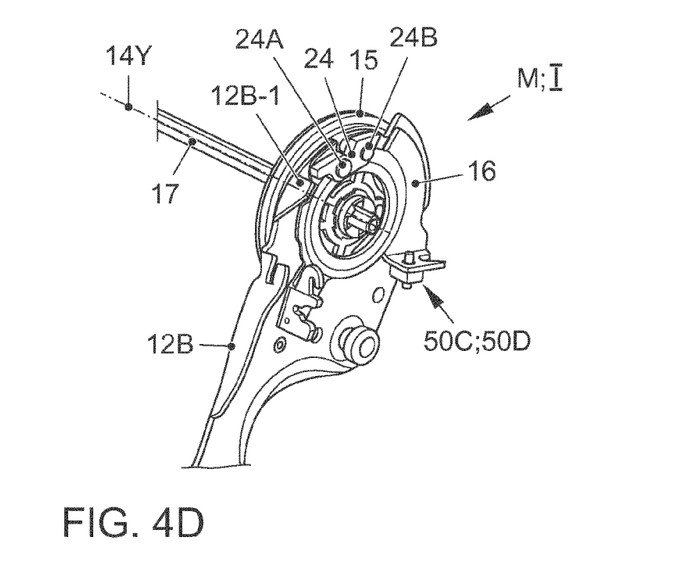
FIG. 4D shows the easy-entry mechanism according to FIG. 2 but without an adjustment lever and without an easy-entry actuating element and without a securing element and without a rotating ring.

A second spring element F-30 is hooked at the one end in a mount in easy-entry actuating element 30, and is hooked at the other end in a mount of a base plate 16, which is shown in the assembled state in FIG. 4D. The arrangement of spring element F-30 is best seen in FIG. 2.

FIG. 4D shows the easy-entry mechanism M according to FIG. 2 but without an adjustment lever 22 and without an easy-entry actuating element 30 and without a securing element 40 and without rotating ring 50.

Behind easy-entry actuating element 30 as seen in the direction the backrest pivot axis 14Y, a securing element 40 (compare FIGS. 3B and 4B) is arranged in the manner of a securing ring for a rotating ring 50, which functions as a drive element.

FIG. 4B shows the easy-entry mechanism M according to FIG. 2 but without an adjustment lever 22 and without an easy-entry actuating element 30.

Rotating ring 50 is connected to base plate 16 via a third spring element F-50 (compare FIGS. 3B and 4C).

FIG. 4C shows the easy-entry mechanism according to FIG. 2 but without an adjustment lever 22 and without easy-entry actuating element 30 and without a securing element 40.

Fourth spring element F-50 is preferably a tension spring and serves to return rotating ring 50 to a home position. Tension spring F-50 is hooked at the one end in a mount of rotating ring 50 and at the other end in a mount of base plate 16, as is best shown in the assembled state in FIG. 4B.

Rotating ring 50 has a cam 50A (also compare FIG. 4C) which interacts with a latch 24 (compare all figures), as will be explained below.

Latch 24 has a first contour 241, a second contour 242, and a stepped contour 243, which will be explained in connection with the functional description.

Rotating ring 50 is also rotatably mounted on base plate 16 about backrest pivot axis 14Y. Backrest axis of rotation 14Y runs through rotating ring 50 according to the drawing.

A pull element 60 (compare FIG. 4C) is fixedly connected to rotating ring 50. Pull element 60 is clipped in particular onto a cooperating section 50B of rotating ring 50. Latch 24 is rotatably mounted on rotating ring 50 by means of a latch pivot pin 24A.

Pull element 60 comprises a Bowden anchor 60A for the core of second Bowden cable B2. Second Bowden cable B2 is used for the easy-entry seat rail unlocking of vehicle seat 100. As already described above, when the second Bowden cable is actuated, locking device 200A is opened and upper rail 201 (therefore vehicle seat 100) is adjustable relative to lower rail 202, fixed to the body, by the amount X1 and additionally by the amount X2, in particular by a further 70 mm, by overall a maximum of 250 mm.

Latch 24 further comprises a control pin 24B which is fixedly arranged in latch 24 which can be pivoted about latch pivot pin 24A (compare FIGS. 2, 5A, and 5B).

A third spring element F-24 is hooked at the one end to a control pin 24B belonging to latch 24 (compare FIGS. 2 and 4V), whereas third spring element F-24 is hooked at the other end to a mounting pin of pull element 60.

Control pin 24B protrudes out of latch 24 on the side facing side part 12B and, in an initial position I, does not yet lie on a slideway 12B-2, formed on the end side of side part 12B, but lies in a semicircular indentation 12C, securing initial position I, of side part 12B (compare FIG. 3B). Such a indentation 16C (compare FIG. 3B) is also provided in base plate 16, in which control pin 24B lies in initial position I.

Side part 12B in addition comprises an easy-entry stop 12B-1, preferably molded on on the seat structure side and against which backrest 14, adjusted in its inclination in the easy-entry function, strikes by means of its backrest-side easy-entry backrest stop 14A.

Stops 12B-1 of side part 12B and stop 14A of backrest 14 thus define the limits of the pivoting range of backrest 14 in the easy-entry position, as will be explained below.

Rotating ring 50 includes in addition a stop 50C (compare FIG. 3B), which belongs to an adjuster 50D for the play of rotating ring 50. The play between rotating ring 50 and base plate 16 is set by adjuster 50D, which can be screwed in and out of a holder 16B of the base plate (compare FIGS. 4A, 4B).

Base plate 16 also has a slideway 16A. Rotating ring 50 lies with its side, facing base plate 16, against slideway 16A, so that a low-friction rotational movement between base plate 16 and rotating ring 50 is ensured.

Regarding the Functioning:

FIG. 5A shows the initial position I of the easy-entry mechanism M as previously explained in detail.

FIG. 5B shows the easy-entry mechanism M in an actuating position II, but before an easy-entry folding of backrest 14 and before the simultaneous easy-entry seat movement of vehicle seat 100.

To actuate the easy-entry function, an easy-entry triggering element, in particular a handle 11, is provided at the upper end of backrest 14 (compare FIG. 1), said element which is set up to bring about a locking/unlocking of the easy-entry mechanism, as will be explained below.

Handle 11 is connected to the core of first Bowden cable B1, as is also shown in FIG. 1.

By actuating handle 11, easy-entry actuating element 30 (compare FIG. 5B with respect to FIG. 5A) is pulled in the clockwise direction and thus (without freewheeling 30B– of a freewheel mechanism 30B, relative to transmission rod 17) is also rotated in the clockwise direction, as a result of which fitting 15 is unlocked. This already ensures that backrest 14 can be folded onto seat part 12 in the easy-entry position within the easy-entry function, as will be explained in more detail below.

By actuating easy-entry actuating element 30, third spring element F-30 is tensioned, which is hooked at the one end in segment 30C and at the other end in base plate 16.

In addition, slideway 30D on the segment side is guided along control pin 24B of latch 24 due to the rotational movement of easy-entry actuating element 30 in the clockwise direction (also compare FIG. 4A).

As a result, latch 24, which is rotatably mounted on a latch pivot axis 24Y, is raised on its rear side by the raising of control pin 24B, which is arranged integrated in the rear part of latch 24. In this case, second spring element F-24 is tensioned, which is hooked at the one end in control pin 24B (compare FIGS. 2 and 4) and at the other end in pull element 60 (compare FIG. 4B).

By raising latch 24, the section of control pin 24B, which faces fitting 15 and which protrudes from latch 24, moves out of indentations 12C and 16C of side part 12B and base plate 16, which until then lies positionally secured in indentations 12C and 16C.

A second contour 242 in this case strikes against cam 50A arranged in the rotation plane of the latch, as becomes clear in particular by comparing FIGS. 5A and 5B. In other words, the angle of rotation of latch 24 is determined and limited, on the one hand, by the positioning of cam 50 on rotating ring 50 and, on the other, by control pin 24B lying in indentations 12C, 16C.

The force of second spring element F-24 pulls counterclockwise on pull element 60. The force of second spring element F-24, which pulls on pull element 60, does not yet cause rotating ring 50 to rotate counterclockwise due to the raising of latch 24 on its rear side.

The rotation of rotating ring 50 counterclockwise is carried out as follows:

By raising latch 24, first contour 241 (compare FIG. 5B) is moved so far upward by the pivoting of latch 24 that it is carried along by easy-entry stop 14A on the backrest side as soon as backrest 14 is folded forward.

By folding backrest 14 counterclockwise, easy-entry stop 14A takes along rotating ring 50 counterclockwise. In this regard, pull element 60 is also carried along, whereby the core of second Bowden cable B2 is pulled, which is hooked in a Bowden anchor 60A of pull element 60 (compare FIG. 5B).

By actuation of second Bowden cable B2, locking device 200A of seat rail pair 200 is unlocked parallel to the folding of backrest 14 in the counterclockwise direction, so that vehicle seat 100 can be adjusted in the longitudinal seat direction within the easy-entry function.

When rotating ring 50 rotates counterclockwise, the fourth spring element is tensioned, which is hooked at the one end into base plate 16 and into rotating ring 50 at the other end (compare FIG. 4B).

The pivot angle of backrest 14 traversed in the easy-entry function from its initial position I is determined by the correspondingly positioned structure-side easy-entry stop 12B-1.

Due to the joint rotation of latch 24 and rotating ring 50 in the described folding of backrest 14, stepped contour 243 of the latch after a predetermined pivoting angle, which in the exemplary embodiment is approximately 40°, comes in contact with the seat-structure-side easy-entry stop 12B-1 lying in the pivoting plane of latch 24, whereby the pivoting movement of backrest 14 in the direction of seat part 12 is limited.

In the folded easy-entry position of backrest 14, backrest 14 remains unlocked.

The user can restore the original initial position I by pulling on backrest 14 and pivoting back backrest 14 clockwise.

In the original position, backrest 14 and also seat rail pair 200 are automatically locked again.

The parts deflected in the easy-entry position are moved back to their initial position by spring elements F-24, F-30, F-50. Latch 24 is pulled back into its initial position by second spring element F-24. Latch 24 can return to its initial position, because rotating ring 50 is also rotated clockwise back into its initial position by fourth spring element F-50. Parallel thereto, easy-entry actuating element 30 is also pulled back counterclockwise with the corresponding freewheeling 30B+(without transmission rod 17 being carried along) into its initial position I by third spring element F30 in the position shown in FIG. 5A.

It becomes clear from the detailed description that latch 24 in its initial position cannot be carried along by easy-entry stop 14A, which is seen as a significant advantage of the easy-entry mechanism M of the invention. As previously explained in detail, latch 24 is first brought into the pivoting range of easy-entry stop 14A by slideway 30D of segment 30C of easy-entry actuating element 30 when it rotates clockwise.

Advantageously, latch 24 therefore does not have to be actuated for the described tilt adjustment of backrest 14 outside of the easy-entry function. In the publication DE 10 2015 218 873 A1, mentioned as the prior art in the introduction to the description, the fittings can only be unlocked without a corresponding unlocking of the seat rail pair if latch 24 pivoted in this way by actuation of the adjustment lever is pivoted out of the travel path of easy-entry stop 14A. In other words, only an actuation of the adjustment lever ensures a release position of the associated easy-entry mechanism.

In the easy-entry mechanism of the invention, the operation processes are clearly separated from one another. Only handle 11 is actuated in the easy-entry function.

In the tilt adjustment function of backrest 14, only adjustment lever 24 is actuated. This results in a significant advantage in the clear assignment of the operating elements to the respective function.

In addition, the adjustment lever in the publication DE 10 2015 218 873 A1 is connected to a base plate via a first spring element and to the latch via a second spring element. In this case, the latch is rotatably mounted in a drive element which belongs to the easy-entry mechanism and is comparable to rotating ring 50 of the easy-entry mechanism M of the invention. There is thus a direct flow of force between the latch and the adjustment lever via this second spring element in the conventional easy-entry mechanism; this is eliminated by the design of the easy-entry mechanism of the invention. According to the invention, a decoupling of the easy-entry mechanism M on the force flow side is a further essential advantage of the solution presented in this patent application.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle seat, comprising:
a backrest that is pivotable about a backrest pivot axis;
at least one pair of seat rails to adjust a seat length of the vehicle seat;
a locking device to lock the at least one pair of seat rails;
at least one lockable fitting to deflect the backrest relative to a seat part, the backrest being pivoted pivotable into an easy-entry position for easier accessibility to a row of seats; and
an easy-entry mechanism that comprises a latch, which is arranged on a drive element and which is captured by an easy-entry stop arranged on the backrest during pivoting of the backrest into the easy-entry position and thereby follows the motion of the backrest,
wherein the latch is moved by an easy-entry actuating element from an easy-entry stop initial position to an easy-entry stop actuating position, in which the latch is captured by the easy-entry stop,
wherein movement of the easy-entry actuating element occurs upon actuating an easy-entry triggering element, which is operatively connected to the easy-entry actuating element via a first Bowden cable, wherein a first end of the first Bowden cable is received in a Bowden anchor of the easy-entry actuating element and a second end of the first Bowden cable is connected to the easy-entry triggering element, such that the easy-entry actuating element moves the latch from the easy-entry stop initial position to the easy-entry stop actuating position by an operative connection between the latch and the easy-entry actuating element.

2. The vehicle seat according to claim 1, wherein the operative connection between the easy-entry triggering element and the easy-entry actuating element is established by the first Bowden cable, the actuation of which brings about the easy-entry stop actuating position of the latch.

3. The vehicle seat according to claim 1, wherein the operative connection between the easy-entry actuating element and the latch is established by a slideway of the easy-entry actuating element which engages on a control pin integrated in the latch, the slideway ensuring a displacement of the control pin, such that a stop-side first contour of the latch arrives at the easy-entry-stop actuating position.

4. The vehicle seat according to claim 3, wherein the slideway is formed on an end face of a segment of the easy-entry actuating element, the segment projecting radially with respect to the backrest pivot axis.

5. The vehicle seat according to claim 1, wherein the easy-entry actuating element has a freewheel mechanism relative to a transmission rod arranged along the backrest pivot axis.

6. The vehicle seat according to claim 5, wherein the actuation of the easy-entry actuating element by actuation of the easy-entry triggering element, in addition to actuation of the latch into the easy-entry stop actuating position, causes rotation of the transmission rod and thus unlocking of the at least one lockable fitting because the easy-entry actuating element has the freewheel mechanism which causes the transmission rod to be taken along without freewheeling as soon as the easy-entry triggering element is actuated.

7. The vehicle seat according to claim 1, wherein the vehicle seat has an adjustment lever arranged on a transmission rod for a tilt adjustment of the backrest relative to the seat part with a freewheel mechanism, which is arranged on the easy-entry mechanism but is decoupled on a force flow side from the easy-entry mechanism.

8. The vehicle seat according to claim 1, wherein the drive element is mounted on and rotatable about a transmission rod that extends along the backrest pivot axis.

9. A vehicle seat comprising:
a backrest that is pivotable about a backrest pivot axis;
at least one pair of seat rails to adjust a seat length of the vehicle seat;
a locking device to lock the at least one pair of seat rails;
at least one lockable fitting to deflect the backrest relative to a seat part, the backrest being pivotable into an easy-entry position for easier accessibility to a row of seats; and
an easy-entry mechanism that comprises a latch, which is arranged on a drive element and which is captured by an easy-entry stop arranged on the backrest during pivoting of the backrest into the easy-entry position and thereby follows the motion of the backrest,
wherein the latch is moved by an easy-entry actuating element from an easy-entry stop initial position to an easy-entry stop actuating position, in which the latch is captured by the easy-entry stop,
wherein movement of the easy-entry actuating element occurs upon actuating an easy-entry triggering element, which is operatively connected to the easy-entry actuating element via a first Bowden cable, such that the easy-entry actuating element moves the latch from the easy-entry stop initial position to the easy-entry stop actuating position by an operative connection between the latch and the easy-entry actuating element, and
wherein the latch is rotatably mounted in a rotating ring, which is rotatably mounted on the backrest pivot axis, wherein the latch rotates about a latch pivot axis that is arranged parallel to the backrest pivot axis, wherein a pull element is fixedly arranged on the rotating ring, and wherein the rotating ring is the drive element.

10. The vehicle seat according to claim 9, wherein the pull element has a Bowden anchor for the one that receives a first end of a second Bowden cable, and wherein a second end of the second Bowden cable is operatively connected to the locking device of the at least one pair of seat rails.

11. The vehicle seat according to claim 10, wherein the easy-entry stop captures the latch on a stop-side first contour of the latch by a movement of the backrest, as a result of which the rotating ring and the pull element are pivoted about the backrest pivot axis so that the second Bowden cable is actuated and the locking device of the at least one pair of seat rails is unlocked.

\* \* \* \* \*